United States Patent [19]

Magnuson

[11] 4,344,564
[45] Aug. 17, 1982

[54] THERMAL BY-PASS VALVE WITH INTEGRAL PRESSURE RELIEF

[75] Inventor: Ruel D. Magnuson, Eagle, Nebr.

[73] Assignee: Gould Inc., Rolling Meadows, Ill.

[21] Appl. No.: 237,543

[22] Filed: Feb. 23, 1981

[51] Int. Cl.³ .............................................. F01P 7/16
[52] U.S. Cl. .................................. 236/34.5; 236/92 C
[58] Field of Search ...................... 236/34.5, 34, 92 C, 236/92 R; 137/115

[56] References Cited

U.S. PATENT DOCUMENTS

| | | | |
|---|---|---|---|
| 2,290,059 | 7/1942 | Martin-Hurst | 236/92 C |
| 2,400,615 | 5/1946 | Warrick et al. | 236/92 R X |
| 2,400,911 | 5/1946 | Booth | 236/92 R X |
| 2,510,473 | 6/1950 | Jensen | 236/34.5 |
| 3,011,506 | 12/1961 | Schwartz et al. | 137/115 |
| 3,404,837 | 10/1968 | James | 236/34.5 |
| 3,913,831 | 10/1975 | Tacak | 236/34.5 |
| 4,190,198 | 2/1980 | Casuga et al. | 236/34.5 |
| 4,288,033 | 9/1981 | Wasyanski | 236/34.5 X |

Primary Examiner—William E. Tapolcai, Jr.
Attorney, Agent, or Firm—Russell E. Baumann

[57] ABSTRACT

A thermal by-pass valve with integral pressure relief including a body having an inlet port and a pair of aligned outlet ports and a T-shaped passage connecting the ports, a temperature sensitive valve element movably mounted in said passage adapted to close one of the outlet ports in one position and the other of the outlet ports in another position, a pressure sensitive valve element in the passage adjacent the first inlet port and contacting the temperature sensitive valve element to close that port when the temperature sensitive valve element is in the one position, and means movably mounting the pressure sensitive valve element to break the contact whenever the pressure exceeds a predetermined value.

8 Claims, 4 Drawing Figures

THERMAL BY-PASS VALVE WITH INTEGRAL PRESSURE RELIEF

BACKGROUND AND SUMMARY

This invention relates to a thermal by-pass valve with integral pressure relief. The valve is arranged to change fluid flow direction at a specific fluid temperature and also to relieve excess fluid pressure.

The invention finds application to systems such as hydrostatic drives. Such systems could use this valve on return lines where the fluid flow is to be directed back to the reservoir when the temperature is below a given point and directed to the oil cooling system when the fluid temperature is above this point. The integral relief is to relieve any pressure that would be detrimental to the cooling system.

The inventive valve includes a body providing an inlet port and a pair of outlet ports which are generally arranged in the form of a T and with the outlet ports being aligned. Mounted in the flow passage connecting the outlet ports is a temperature sensitive valve element which closes one or the other of the outlet ports depending upon the temperature of the fluid flowing in the passage. Additionally there is a pressure sensitive valve element which, in the illustration given, serves as the valve seat for the temperature sensitive valve element and which is moved out of seating relationship when the pressure exceeds a predetermined value.

Other objects, advantages and details of the construction and operation of the inventive valve can be seen in the ensuing description.

DETAILED DESCRIPTION

The invention is described in conjunction with an illustrative embodiment, in the accompanying drawing, in which.

OPERATION

Figure 2:
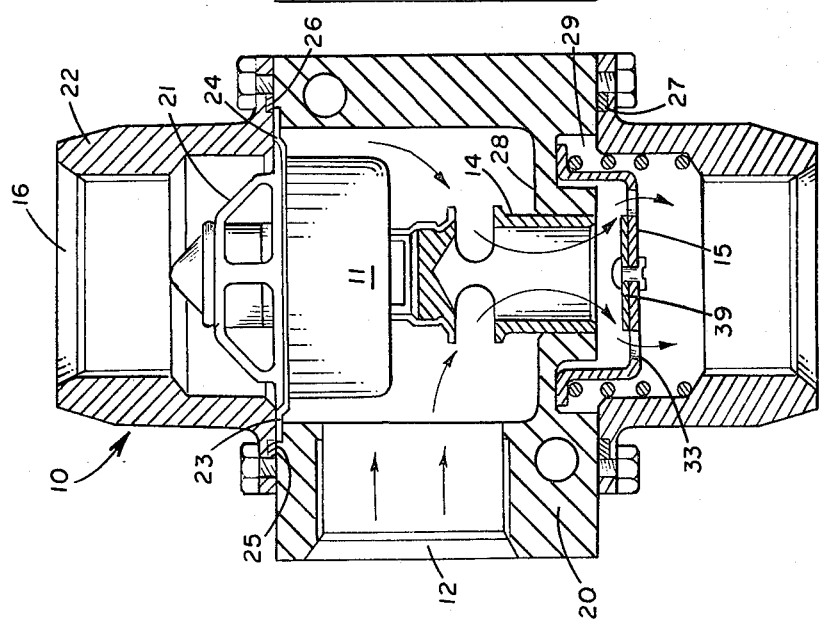

FIG. 2 illustrates the valve 10 operating at a temperature below the predetermined temperature at which the temperature sensitive valve element 11 shifts. Fluid flow from the inlet port 12 is directed to the outlet port 13 through a sealing sleeve 14 and a pressure sensitive valve element 15. Outlet port 16 is blocked by the temperature sensitive valve element 11.

Figure 3:
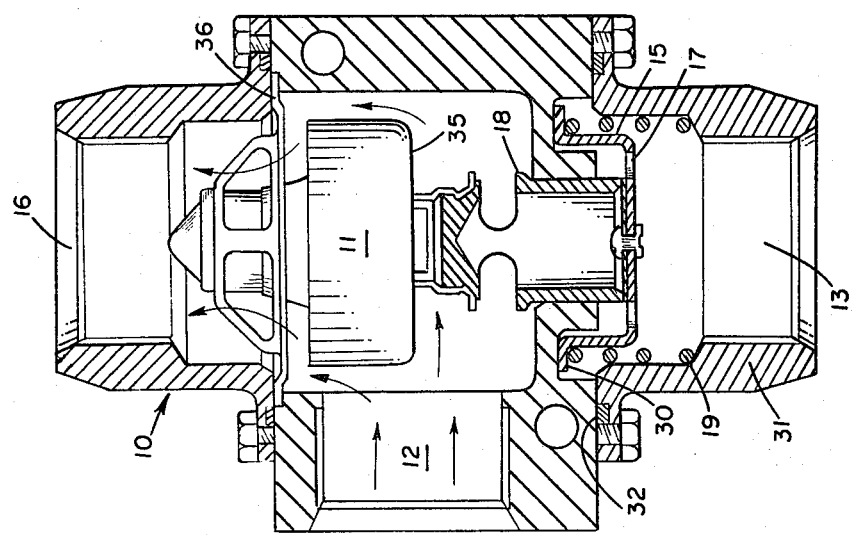

FIG. 3 illustrates the valve 10 operating at temperatures above the predetermined temperature at which the temperature sensitive valve element shifts. In such a case, fluid flow from the inlet port 12 is directed to the outlet port 16 through the temperature sensitive valve element 11. The outlet port 13 is blocked between contact between the sealing sleeve 14 and the pressure sensitive valve element 15 at the annular position designated 17.

Figure 4:
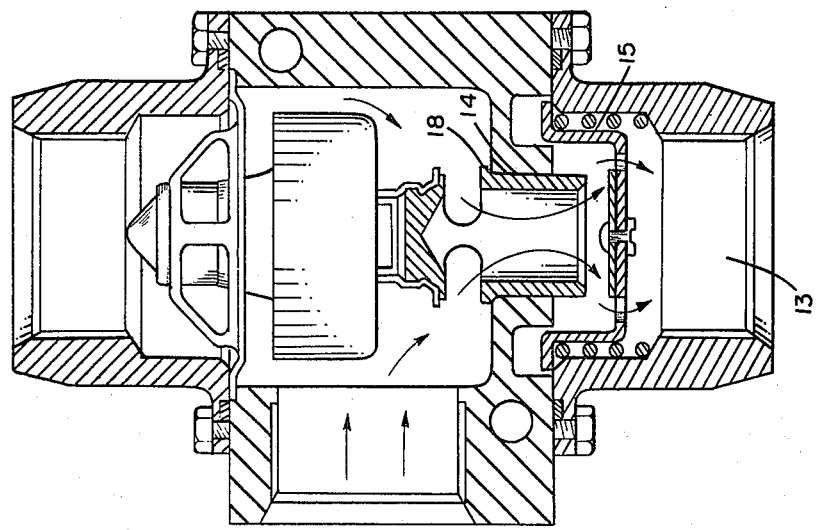
FIGS. 2–4 are schematic sectional views of the valve of FIG. 1 but with the valve elements in different operating positions.

FIG. 4 illustrates the valve with fluid pressure exceeding the relief valve pressure, i.e., a predetermined pressure. Excess fluid pressure is released through the sealing sleeve 14 and pressure sensitive valve element 15 to the outlet port 13. A shoulder 18 prevents the sealing sleeve 14 from over-travel. After excess fluid pressure is relieved, the pressure sensitive valve element 15 is shifted back to the position of FIG. 3 by means of the spring 19.

Figure 1:
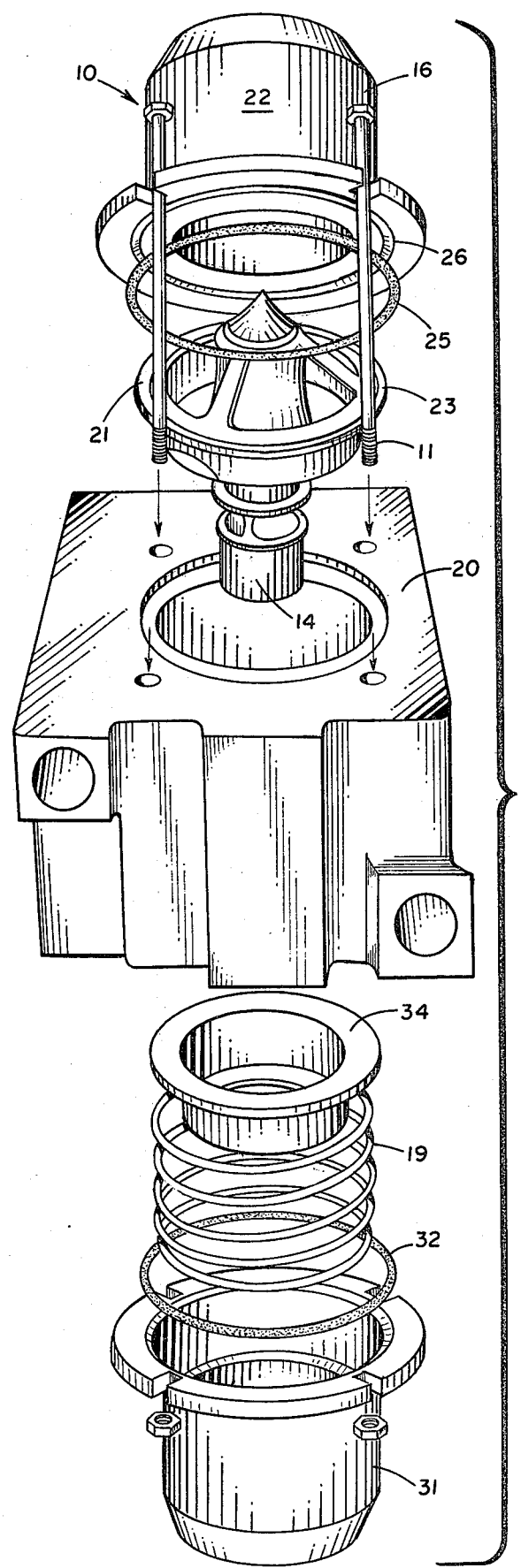
FIG. 1 is an exploded perspective view of the inventive valve.

As can be best appreciated from a consideration of FIG. 1, the valve 10 includes a block-like body 20 which, as can be seen from FIGS. 2–4—is equipped with a T-shaped flow passage. More particularly, first and second outlet ports 13 and 16 are provided in generally aligned relationship with the flow passage therebetween constituting the bar of the T. Positioned intermediate the two outlet ports 13 and 16 is an inlet port 12 communicating with the outlet ports through the "stem" of the T.

Referring again to FIG. 1, the temperature sensitive valve element 11 is seen to include a spider-like superstructure 21. This, as can be seen in FIGS. 2–4—is clamped between the body 20 and the outlet fitting 22 associated with the second outlet port 16. More particularly, the body 21 is equipped with an annular recess 23 in which the flange portion 24 of the spider-like superstructure is positioned. The outlet fitting 22 is equipped with an annular recess as at 26 for the receipt of an O-ring 25 and is itself clamped to the body 20 by means of a plurality of nut and bolt arrangements 27.

Extending toward the first outlet port 13 from the temperature sensitive valve element 11 is the sealing sleeve 14. As can be best seen in FIGS. 2–4, the valve body provides an annular shoulder as at 28 which serves to guide and support the sealing sleeve 14. The annular shoulder 28 itself is recessed in the portion confronting the first outlet port 13 as at 29. Received within this recess is the flange portion 30 of the cup-shaped member serving as the pressure sensitive valve element 15. The outlet port 13 itself is provided by a fitting 31 which is identical to the fitting 22 and which serves to support the spring 19. The fitting 31 is held in position on the body 20 by the above-mentioned nut and bolt arrangement 27 and there is also interposed between the fitting 31 and the body 20 an O-ring seal as at 32.

As can be best seen in FIG. 1, the pressure sensitive valve element 15 is apertured as at 33 to provide a flow passage with the central bottom portion of the element 15 (as illustrated) being equipped with a disc-like seal 34 which abuts the bottom of the sealing ring 14 when the same is in the configuration illustrated in FIG. 3.

Through the use of the sealing sleeve 14 as illustrated, there is a minimal axial pressure force area thereon which allows the temperature sensitive valve element 11 to shift back and forth even when the valve is pressurized.

The details of the temperature sensitive valve element have been omitted in large part because the same is a commercially available device. Thus, the opening of the aperture sensitive valve element can be appreciated from a comparison of FIGS. 2 and 3 where the portion 35 is in a lowered position relative to the seat 36 associated with the outlet port 16.

While in the foregoing specification a detailed description of an embodiment of the invention has been set down for the purpose of explanation, many variations in the details hereingiven may be made by those skilled in the art without departing from the spirit and scope of the invention.

What is claimed is:

1. A thermal by-pass valve with integral pressure relief comprising a body having an inlet port and a pair of outlet ports and a flow passage connecting all of said ports, a temperature sensitive valve element including a sealing sleeve having a large central hollow portion movably mounted in said passage and adapted to close one of said outlet ports in one position and the other of said outlet ports in another position, a pressure sensitive valve element in said passage adjacent said one outlet port and contacting said temperature sensitive valve element to close said one outlet port when said temperature sensitive valve element is in said one position, and means movably mounting said pressure sensitive valve element to break the contact between said valve elements whenever the pressure in said passage exceeds a predetermined value, said body including a block-like part providing a T-shaped passage, the bar of said T terminating adjacent said outlet ports and the stem of said T terminating adjacent said inlet port, and a pair of generally similar fittings secured to said body, each defining an outlet port.

2. The structure of claim 1 in which said temperature sensitive valve element with said sealing sleeve is adapted to contact said pressure sensitive valve element when said temperature sensitive valve element is in said one position and the pressure in said passage is below said predetermined value.

3. The structure of claim 2 in which said sleeve is equipped with shoulder means limiting the travel of said temperature sensitive valve element toward said pressure sensitive valve element when the pressure in said passage is above said predetermined value.

4. A thermal by-pass valve with integral pressure relief comprising a body with an annular guiding shoulder having a generally linear flow passage therein with first and second outlet ports adjacent each end of said passage, a movably mounted valve seat in said passage adjacent said first outlet port and a fixed valve seat in said passage adjacent said second outlet port, an inlet port in said body communicating with said passage between said valve seats, a temperature sensitive valve element slidably mounted in said passage, said temperature sensitive valve element being equipped with a hollow sleeve extending toward said movable seat and being in guided relationship with said shoulder, said sleeve presenting a relatively small annular force area as compared to said temperature sensitive valve element to facilitate shift of said temperature sensitive valve element even under pressure, said sleeve being equipped with fluid inlet means adjacent the end spaced from said movable seat, said temperature sensitive valve element when fluid entering said inlet port is below a predetermined temperature being seated against said fixed valve seat and spaced from said movable valve seat and when fluid entering said inlet port is above said predetermined temperature said temperature sensitive valve element being spaced from said fixed valve seat and in seating engagement with said movable valve seat except when pressure in said passage exceeds a predetermined value.

5. A thermal by-pass valve with integral pressure relief comprising a body with an annular guiding shoulder having a generally linear flow passage therein with first and second outlet ports adjacent each end of said passage, a movably mounted valve seat in said passage adjacent said first outlet port and a fixed valve seat in said passage adjacent said second outlet port, an inlet port in said body communicating with said passage between said valve seats, said body including a block-like part providing a T-shaped passage, the bar of said T terminating adjacent said outlet ports and the stem of said T terminating adjacent said inlet port, and a pair of generally similar fittings secured to said body each defining an outlet port, a temperature sensitive valve element slidably mounted in said passage, said temperature sensitive valve element being equipped with a hollow sleeve extending toward said movable seat and being in guided relationship with said shoulder, said sleeve presenting a relatively small annular force area as compared to said temperature sensitive valve element to facilitate shift of said temperature sensitive valve element even under pressure, said sleeve being equipped with fluid inlet means adjacent the end spaced from said movable seat, said temperature sensitive valve element when fluid entering said inlet port is below a predetermined temperature being seated against said fixed valve seat and spaced from said movable valve seat and when fluid entering said inlet port is above said predetermined temperature said temperature sensitive valve element being spaced from said fixed valve seat and in seating engagement with said movable valve seat except when pressure in said passage exceeds a predetermined value.

6. A thermal by-pass valve with integral pressure relief comprising a body having an inlet port and a pair of outlet ports and a flow passage connecting all of said ports, a temperature sensitive valve element including a sealing sleeve movably mounted in said passage and adapted to close one of said outlet ports in one position and the other of said outlet ports in another position, a pressure sensitive valve element in said passage adjacent said one outlet port and contacting said temperature sensitive valve element to close said one outlet port when said temperature sensitive valve element is in said one position, said pressure sensitive valve element including a cup-shaped member having an open end for the receipt of said sealing member and an oppositely disposed partially closed end for the contacting receipt of said sealing sleeve, said member having a generally annular opening in said closed end whereby when fluid enters said sealing sleeve, contact of said sleeve with said closed end prevents fluid flow through said pressure sensitive valve element, and means movably mounting said pressure sensitive valve element to break the contact between said valve elements whenever the pressure in said passage exceeds a predetermined value.

7. The structure of claim 6 in which said member is equipped with an integral annular flange adjacent said open end, and spring means in said body urging said member toward said sealing sleeve.

8. The structure of claim 7 in which said body is equipped with an annular recess adjacent said one port for slidable receipt of said flange.

* * * * *